(12) United States Patent
Lin et al.

(10) Patent No.: US 9,588,622 B2
(45) Date of Patent: Mar. 7, 2017

(54) SINGLE LAYER CAPACITIVE TOUCH MODULE BACKLIGHT MODULE

(71) Applicant: SHENZHEN CHINA STAR OPTOELECTRONICS TECHNOLOGY CO., LTD., Shenzhen (CN)

(72) Inventors: Yung-Lun Lin, Shenzhen (CN); Chun Kai Chang, Shenzhen (CN); Jie Qiu, Shenzhen (CN); Chengliang Ye, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 472 days.

(21) Appl. No.: 14/234,422

(22) PCT Filed: Jan. 9, 2014

(86) PCT No.: PCT/CN2014/070377
§ 371 (c)(1),
(2) Date: Jan. 23, 2014

(87) PCT Pub. No.: WO2015/100773
PCT Pub. Date: Jul. 9, 2015

(65) Prior Publication Data
US 2015/0185266 A1    Jul. 2, 2015

(30) Foreign Application Priority Data

Dec. 31, 2013  (CN) .......................... 2013 1 0750183

(51) Int. Cl.
*G06F 3/044*    (2006.01)
(52) U.S. Cl.
CPC .................................... *G06F 3/044* (2013.01)
(58) Field of Classification Search
USPC .................. 324/623–689; 345/173, 174, 104
See application file for complete search history.

(56) References Cited

U.S. PATENT DOCUMENTS

2008/0158181 A1*  7/2008  Hamblin ............... G06F 3/0416
                                                      345/173
2009/0314621 A1  12/2009  Hotelling
(Continued)

FOREIGN PATENT DOCUMENTS

| CN | 101566895 A | 10/2009 |
| CN | 103034380 A | 4/2013 |
| CN | 103440066 A | 12/2013 |

*Primary Examiner* — Melissa Koval
*Assistant Examiner* — Nasima Monsur
(74) *Attorney, Agent, or Firm* — Mark M. Friedman

(57) ABSTRACT

A single layer capacitive touch module including a sensor dot matrix is provided. The sensor dot matrix has M×N sensor dots formed by M driving lines intersecting N sensing lines. Each one of the sensing lines and M driving lines forming a sensor zone, wherein each sensor zone comprises M sensor dots, M and N are positive integers. A driving unit is coupled to the driving lines. A first soft board has a lead-in area on a first side thereof to be coupled with the driving lines on a first side of the sensor dot matrix. A second soft board has a lead-in area on a first side for being coupled with the driving lines and sensing lines on a second side of the sensor dot matrix opposite the first side of the sensor dot matrix.

13 Claims, 3 Drawing Sheets

(56) References Cited

U.S. PATENT DOCUMENTS

| 2010/0085326 | A1  |  4/2010 | Anno |          |
|--------------|-----|---------|------|----------|
| 2010/0309150 | A1* | 12/2010 | Lee  | G06F 3/0412 |
|              |     |         |      | 345/173 |
| 2013/0081869 | A1* |  4/2013 | Kim  | G06F 3/044 |
|              |     |         |      | 174/261 |
| 2013/0335376 | A1* | 12/2013 | Lee  | G06F 3/0416 |
|              |     |         |      | 345/174 |

* cited by examiner

SINGLE LAYER CAPACITIVE TOUCH MODULE BACKLIGHT MODULE

BACKGROUND OF THE INVENTION

1. Field of Invention

The present invention relates to a single layer capacitive touch module, and more particularly, to a soft board (or flexible board, flexible printed board, etc.) design for a single layer capacitive touch module.

2. Description of Prior Art

Refer to FIG. 1 and FIG. 2. FIG. 1 is a drawing for a layout pattern on a single layer capacitive touch module of a prior art. FIG. 2 is a drawing for a soft board design for a single layer capacitive touch module of a prior art. As FIG. 1 shows, a sensor dot matrix 13 comprises M×N sensor dots forming by M driving lines 16 (T1-Tm) intersecting N sensing lines 17 (R1-Rm). In the prior art, the M×N sensor dots need to be individually wired to a coupling area of the sensor dot matrix, then connected with a lead-in area 12 of a soft board 14. Because the lead number of the lead-in area 12 of the soft board 14 should be the same as the lead number of the sensor dots 15, the width of the soft board 14 is accordingly wide. A lead-out area 18 of the soft board 14 opposite the lead-in area 12 of the soft board 14 is too wide to dispose the soft board 12 on an OLB (Outer Lead Bonding) area, making a crowding effect in space distribution on the soft board 12 and the other units of the touch module (not shown).

FIG. 3 is a drawing for a soft board design for a single layer capacitive touch module of another prior art. The difference between FIG. 2 and FIG. 3 is that a double layer soft board 21 is used. A layout pattern 23 is provided on the double layer soft board 21 to implement the bridge connection of the M driving lines 25 (T1-Tm), as a result, the lead number of a lead-out area 24 of the double layer soft board 21 can substantially decrease. Because the width and thickness of a lead-in area 22 of the double layer soft board 21 are too large, the double layer soft board 21 is hard to bend and accordingly the application of the double layer soft board 21 is limited.

BRIEF SUMMARY OF THE INVENTION

The purpose of the present invention is to provide a single layer capacitive touch module to reduce the lead number and make the soft board easy to bend.

To achieve the above purpose, the present invention provides a single layer capacitive touch module comprising: a sensor dot matrix, a driving unit, a first soft board, a second soft board, and a driving soft board.

a sensor dot matrix comprising M×N sensor dots formed by M driving lines intersecting N sensing lines, each one of the sensing lines and M driving lines forming a sensor zone, wherein each sensor zone comprises M sensor dots, M and N are positive integers.

The driving unit coupled to the driving lines. The first soft board having a lead area on a first side thereof to be coupled with the driving lines on a first side of the sensor dot matrix. The second soft board having a lead-in area on a first side for being coupled with the driving lines and sensing lines on a second side of the sensor dot matrix opposite the first side of the sensor dot matrix.

The lead-in area of the first soft board comprises M×N leads. The first soft board having a first layout pattern for implementing a bridge connection of the driving lines, the M sensor dots in one of the sensor zones being wired to the first side of the sensor dot matrix to be directly connected with M leads of the lead-in area of the first soft board.

The M sensor dots in one of the sensing zones are wired to the second side of the sensor dot matrix to be directly connected with M leads of the lead-in area of the second soft board.

The first soft board is foldable, and a second side of the first soft board opposite to the first side thereof is turned to a back side of the sensor dot matrix when the first soft board is folded. The lead-in area of the second soft board comprises M+N leads.

The second soft board having a lead-out area on a second side of the second soft board opposite the first side where the lead-in area is, the second soft board having a second layout pattern comprising M+N leads in the lead-out area of the second soft board.

With the technology proposal of the present invention, the advantage is that it reduces the size of the lead-out area of the second soft board effectively and makes the first soft board able to be bent, reducing the total space required by the first soft board and the second soft board.

DETAILED DESCRIPTION OF THE PREFERRED EMBODIMENTS

Figure 1:
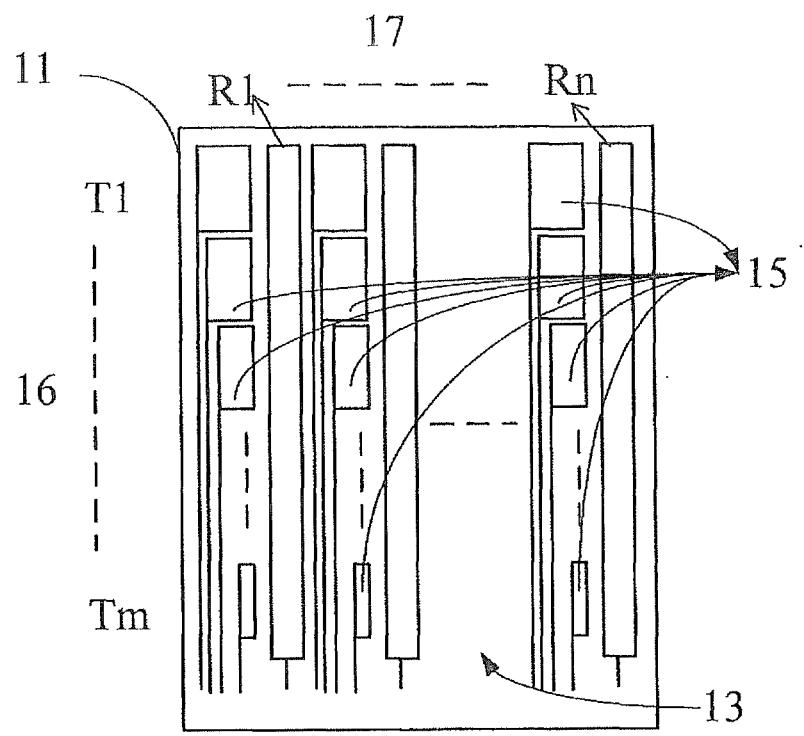
FIG. 1 is a drawing for a layout pattern on a single layer capacitive touch module of a prior art.
Figure 2:
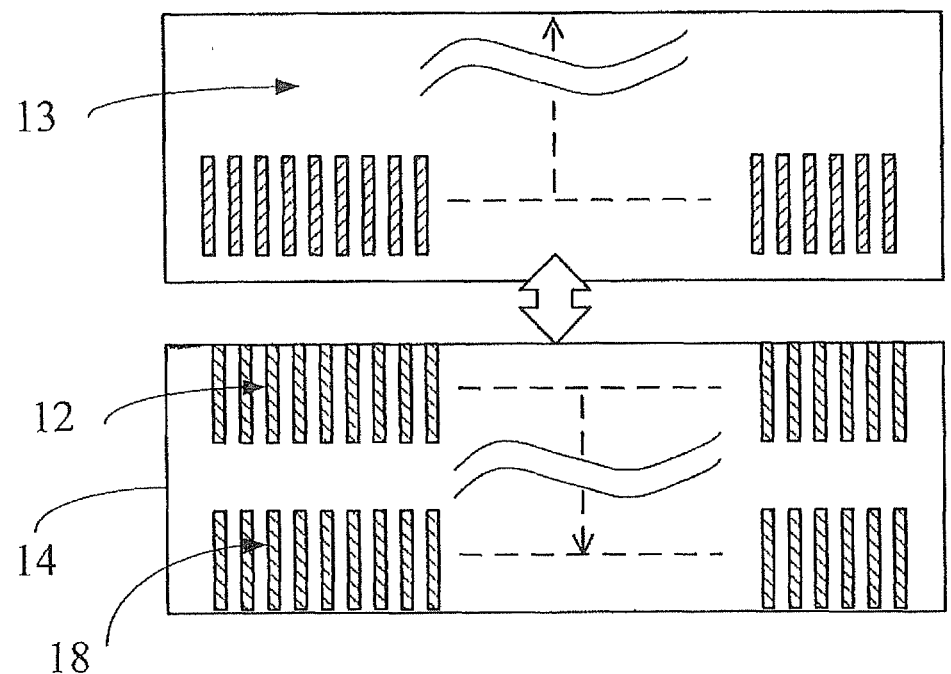
FIG. 2 is a drawing for a soft board design for a single layer capacitive touch module of a prior art.
Figure 3:
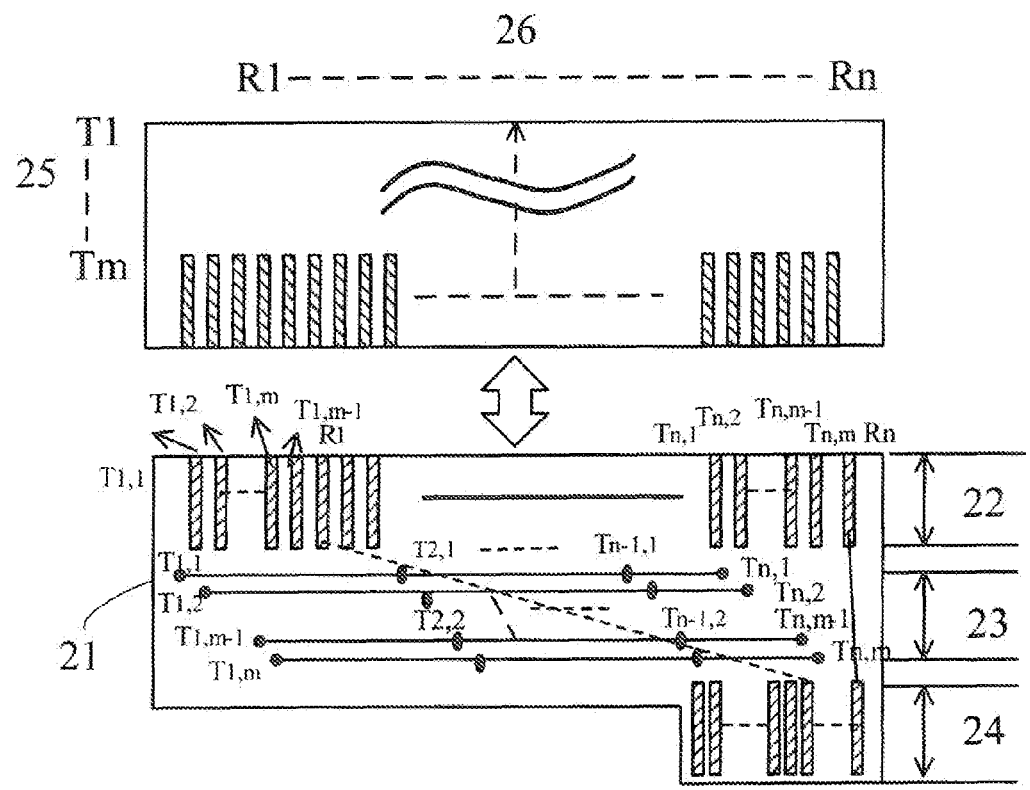
FIG. 3 is a drawing for a soft board design for a single layer capacitive touch module of another prior art.

The following description of every embodiment, with reference to the accompanying drawings, is used to exemplify a specific embodiment which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention. In the drawings, the components having similar structures are denoted by the same numerals.

Figure 4:
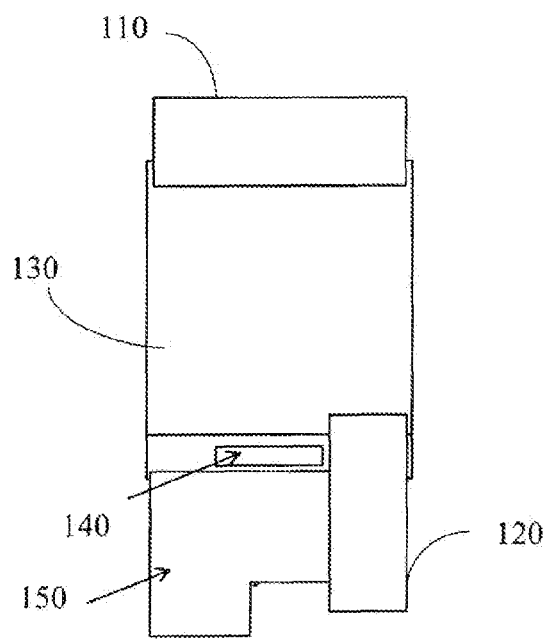
FIG. 4 is a drawing for a structure of a single layer capacitive touch module of a first embodiment of the present invention.
Figure 5:
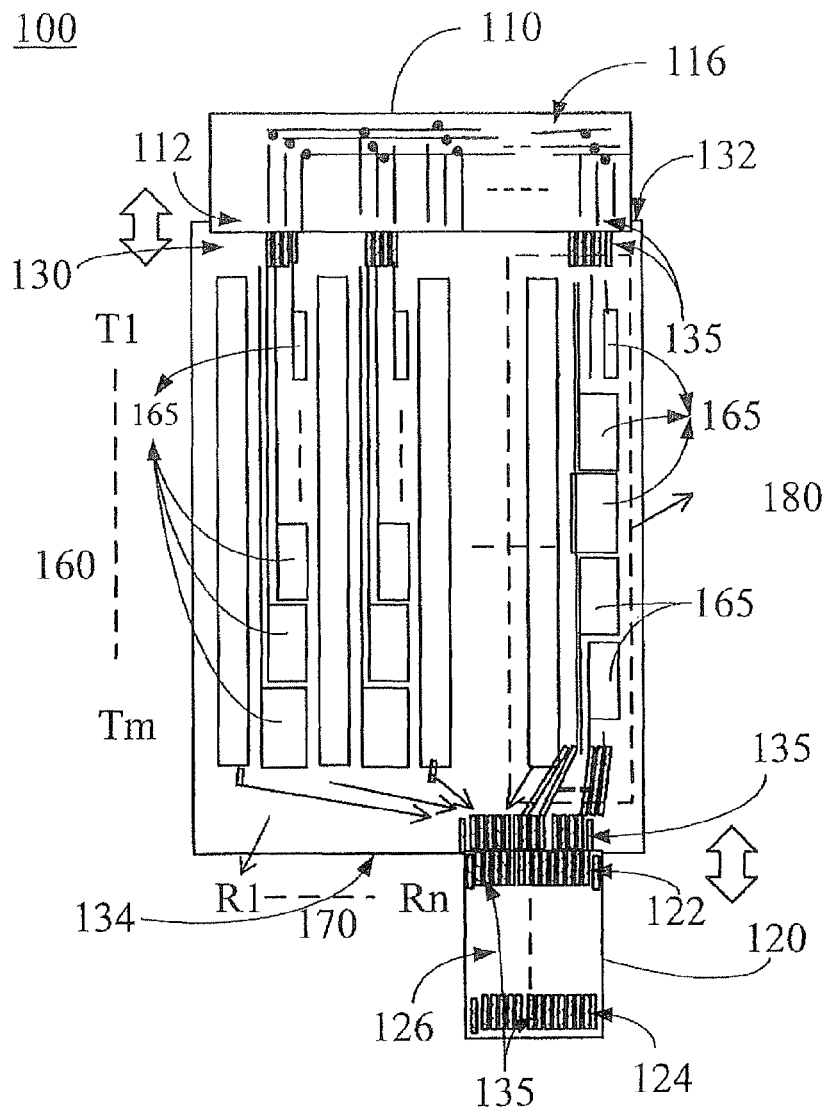
FIG. 5 is a drawing for a soft board design for a single layer capacitive touch module of a first embodiment of the present invention.

Refer to FIG. 4, FIG. 5, and FIG. 7, FIG. 4 is a drawing for a structure of a single layer capacitive touch module of a first embodiment of the present invention, FIG. 5 is a drawing for a soft board design for a single layer capacitive touch module of a first embodiment of the present invention. According to the first embodiment of the present invention, a touch module 100 comprises a sensor dot matrix 130, a driving unit 140, a first soft board 110, a second soft board 120, and a driving soft board 150.

The sensor dot matrix 130 comprising M×N sensor dots 165 formed by M driving lines 160 (T1-Tm) intersecting N sensing lines 170 (R1-Rn) intersect to form M×N sensor dots 165. Each one of the sensing lines 170 and the M driving lines 160 forming a sensor zone 180, wherein each sensor zone 180 comprises M sensor dots 165, which means that the sensor dot matrix 130 comprises N sensor zones 180, M and N are positive integers. The driving lines 160 wire M×N lines to couple the M×N leads 135 on the first side 132 of the sensor dot matrix 130 with the first soft board 110. Wherein one of the sensor zones 180 wires extra M lines to couple the M leads 135 on the second side 134 of the sensor dot matrix 130 with the second soft board 120, and plus N lines of the sensing lines 170 to couple the N leads 135 of the second side 134 of the sensor dot matrix 130 with the second soft board 120.

The first soft board 110 having a lead-in area 112 on a first side thereof to be coupled with the driving lines 160 on a first side of the sensor dot matrix 130. The first soft board 110 has a first layout pattern 116, and the first layout pattern 116 implements the bridge connection of the driving lines 160 (T1-Tm). Mutual connections among the M driving lines 160 in each of the sensor zones 180 are achieved by the first layout pattern. It means that the lead-in area 112 of the first soft board 110 comprises M×N leads 135.

The second soft board 120 having a lead-in area 122 on a first side for being coupled with the driving lines 160 (T1-Tm) and sensing lines 170 (R1-Rn) on a second side 134 of the sensor dot matrix 130 opposite the first side 132 of the sensor dot matrix 130. The second soft board 120 having a lead-out area 124 on a second side of the second soft board 120 opposite the first side where lead-in area 122 is, the second soft board 120 having a second layout pattern 126 comprising M+N leads 135 in the lead-out area 124 of the second soft board 120. The second layout pattern 126 is applied for implementation of the directly wiring the M driving lines 160 of one of the sensor zones 180 and N sensing lines 170 to the lead-out area 124 of the second soft board 120. It means that there are M+N leads 135 in the lead-in area 122 of the second soft board 120. There are M+N leads 135 in the lead-out area 124 of the second soft board 120 the same as the lead-in area 122 of the second soft board 120.

The lead-in area 112 of the first soft board 110 comprises M×N leads 135. Correspondingly, the first side 132 of the sensor dot matrix 130 needs to have M×N leads 135. Hence, the first soft board 110 needs a larger width than the second soft board 120. However, there are no other units around the first soft board 110, and the first soft board 110 is a single layer structure which is easy to bend. Then, a crowding effect in space distribution to the other units of the touch module is not going to happen.

The lead-in area 122 of the second soft board 120 comprises M+N leads 135, the corresponding second side 134 of the sensor dot matrix 130 needs to have M+N leads 135 to substantially reduce the lead number of the second soft board 120 in comparison with the first soft board 110. In the prior art, the first side 132 or the second side of the sensor dot matrix 130 is close to the driving soft board 150, the driving unit 140 and other units (not shown). In the present embodiment, the width of the second soft board 120 is decreased by lowering the lead number of the lead-in area 122 and lead-out area 124 of the second soft board 120. The second side 134 of the sensor dot matrix 130 is near to the driving soft board 150, the driving unit 140 and the other units (not shown) without making a crowding effect in space distribution to the other units of the touch module, Thus making the touch module have more space to dispose other units (not shown).

A dashed circle in FIG. 5 indicates one of the sensor zones 180. The M sensor dots 165 in one of the sensor zones 180 are directly wired to the first side 132 of the sensor matrix 130 for direct connection with the M leads 135 of the lead-in area 112 of the first soft board 110. The M sensor dots 165 in one of the sensor zones 180 are directly wired to the second side 134 of the sensor matrix 130 for direct connection with the M leads 135 of the lead-in area 122 of the second soft board 120. By coupling the first soft board 110 and the second soft board 120 with all of the sensor dots 165 through the sensor zone 180, the technical advantage that only can be accomplished by using a double layer soft board in the prior art is achieved by the present invention. The embodiment of the present invention completes the bridge connection of the driving lines 160 (T1-Tm) in the first soft board 110 and completes the signal outputting of the sensor dot matrix 130 in the second soft board 120. The lead-out area 124 of the second soft board 120, which is used to connect the touch module with a handy device or other units, is downsized. Therefore, the space for the soft board is reduced substantially.

Figure 6:
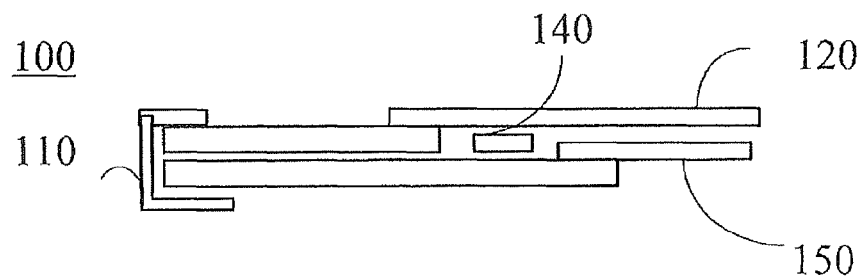
FIG. 6 is a side-view drawing for a soft board design for a single layer capacitive touch module of a second embodiment of the present invention.

FIG. 6 is a side-view drawing for a soft board designed for a single layer capacitive touch module of a second embodiment of the present invention. The difference between the second embodiment of the present invention and the first embodiment of the present invention is bending the first soft board 110 over to the back of the sensor dot matrix 130 to save space for the first soft board 110 and the second soft board 120.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A single layer capacitive touch module comprising:
  a sensor dot matrix comprising M×N sensor dots formed by M driving lines intersecting N sensing lines, each one of the sensing lines and M driving lines forming a sensor zone, wherein each sensor zone comprises M sensor dots, M and N are positive integers;
  a driving unit coupled to the driving lines;
  a first soft board only having a lead area on a first side thereof to be coupled with the M driving lines on a first side of the sensor dot matrix, the first soft board having a first layout pattern for implementing a bridge connection of the M driving lines, the M sensor dots in one of the sensor zones being wired to the first side of the sensor dot matrix to be directly connected with M leads of a lead area of the first soft board; and
  a second soft board having a lead-in area on a first side for being coupled with the M driving lines and the N sensing lines on a second side of the sensor dot matrix opposite the first side of the sensor dot matrix, wherein the lead-in area of the second soft board comprises M+N leads.

2. The single layer capacitive touch module according to claim 1, wherein the lead area of the first soft board comprises M×N leads.

3. The single layer capacitive touch module according to claim 1, wherein the M sensor dots in one of the sensing zones are wired to the second side of the sensor dot matrix to be directly connected with M leads of the lead-in area of the second soft board.

4. The single layer capacitive touch module according to claim 1, wherein the touch module further comprises a driving soft board, the driving soft board and the driving unit are both near to the first side of the sensor dot matrix.

5. The single layer capacitive touch module according to claim 1, wherein the first soft board is foldable, and a second side of the first soft board opposite to the first side thereof is turned to a back side of the sensor dot matrix when the first soft board is folded.

6. The single layer capacitive touch module according to claim 1, wherein the second soft board having a lead-out area on a second side of the second soft board opposite the first side where the lead-in area is, the second soft board having a second layout pattern comprising M+N leads in the lead-out area of the second soft board.

7. A single layer capacitive touch module comprising:
- a sensor dot matrix comprising M×N sensor dots formed by M driving lines intersecting N sensing lines, each one of the sensing lines and M driving lines forming a sensor zone, wherein each sensor zone comprises M sensor dots, M and N are positive integers;
- a driving unit coupled to the driving lines;
- a first soft board only having a lead area on a first side thereof to be coupled with the M driving lines on a first side of the sensor dot matrix; and
- a second soft board having a lead-in area on a first side for being coupled with the M driving lines and the N sensing lines on a second side of the sensor dot matrix opposite the first side of the sensor dot matrix, wherein the lead-in area of the second soft board comprises M+N leads.

8. The single layer capacitive touch module according to claim 7, wherein the lead-in area of the first soft board comprises M×N leads.

9. The single layer capacitive touch module according to claim 7, wherein the first soft board having a first layout pattern for implementing a bridge connection of the driving lines, the M sensor dots in one of the sensor zones being wired to the first side of the sensor dot matrix to be directly connected with M leads of the lead area of the first soft board.

10. The single layer capacitive touch module according to claim 7, wherein the M sensor dots in one of the sensing zones are wired to the second side of the sensor dot matrix to be directly connected with M leads of the lead-in area of the second soft board.

11. The single layer capacitive touch module according to claim 7, wherein the touch module further comprises a driving soft board, the driving soft board and the driving unit are both near to the first side of the sensor dot matrix.

12. The single layer capacitive touch module according to claim 7, the first soft board is foldable, and a second side of the first soft board opposite to the first side thereof is turned to a back side of the sensor dot matrix when the first soft board is folded.

13. The single layer capacitive touch module according to claim 7, wherein the second soft board having a lead-out area on a second side of the second soft board opposite the first side where the lead-in area is, the second soft board having a second layout pattern comprising M+N leads in the lead-out area of the second soft board.

\* \* \* \* \*